US011313975B2

(12) United States Patent
Capet et al.

(10) Patent No.: US 11,313,975 B2
(45) Date of Patent: Apr. 26, 2022

(54) GNSS ANTENNA ADD-ON

(71) Applicant: CENTRE NATIONAL D'ETUDES SPATIALES, Paris (FR)

(72) Inventors: Nicolas Capet, Toulouse (FR); François-Xavier Marmet, Muret (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 56 days.

(21) Appl. No.: 16/762,924

(22) PCT Filed: Nov. 14, 2018

(86) PCT No.: PCT/EP2018/081191
§ 371 (c)(1),
(2) Date: May 9, 2020

(87) PCT Pub. No.: WO2019/101592
PCT Pub. Date: May 31, 2019

(65) Prior Publication Data
US 2020/0284918 A1 Sep. 10, 2020

(30) Foreign Application Priority Data
Nov. 21, 2017 (EP) ..................................... 17306611

(51) Int. Cl.
*G01S 19/22* (2010.01)
*G01S 19/36* (2010.01)

(52) U.S. Cl.
CPC .............. *G01S 19/22* (2013.01); *G01S 19/36* (2013.01)

(58) Field of Classification Search
CPC ................................. G01S 19/22; G01S 19/36

USPC ...................................................... 342/357.61
See application file for complete search history.

(56) References Cited

U.S. PATENT DOCUMENTS

| | | | | | |
|---|---|---|---|---|---|
| 5,841,494 | A | * | 11/1998 | Hall .................. | G02F 1/133555 349/98 |
| 5,995,044 | A | * | 11/1999 | Kunysz ................... | G01S 19/22 342/363 |
| 2003/0233210 | A1 | * | 12/2003 | Liberti, Jr. ............ | G01S 5/0215 702/150 |

(Continued)

FOREIGN PATENT DOCUMENTS

WO 2015/136121 A1 9/2015

OTHER PUBLICATIONS

Khosravi, et al., "A GNSS Antenna with a polarization selective surface for the mitigation of low-angle multipath interference", IEEE transactions on antennas and propagation, vol. 63, No. 12, Dec. 2015.

(Continued)

*Primary Examiner* — Harry K Liu
(74) *Attorney, Agent, or Firm* — Burris Law, PLLC

(57) ABSTRACT

An add-on device configured to reduce the power level of reflected paths of GNSS signals reaching a GNSS receiver's antenna, the associated GNSS receiver set, some equipment embedding the add-on device, and the associated method to reduce the power level of reflected GNSS signals are provided. The GNSS signals are transmitted according to a first polarization, and the add-on device comprises a material configured to be transparent to the first polarization and to reflect GNSS signals polarized according to a second polarization orthogonal to the first polarization.

11 Claims, 9 Drawing Sheets

(56) References Cited

U.S. PATENT DOCUMENTS

| | | |
|---|---|---|
| 2004/0196179 A1 | 10/2004 | Turnbull |
| 2005/0007505 A1* | 1/2005 | Faris .................. C09B 67/0098 349/16 |
| 2011/0012808 A1* | 1/2011 | Tatarnikov ............. H01Q 19/10 343/848 |
| 2015/0011273 A1 | 1/2015 | Wilmhoff et al. |
| 2017/0254901 A1* | 9/2017 | Kim ........................ G01S 19/22 |

OTHER PUBLICATIONS

Cappellin, et al., "Design and Analysis of a Reflector Antenna System Based on Doubly Curved Circular Polarization Selective Surfaces", Proc. EuCAP'2016, 10th European Conference on Antennas and Propagation (EuCAP), Apr. 2016.

Teo, et al., "Frequency-selective surfaces for GPS and DCS1800 mobile communication, Part 1: Quad-layer and single-layer FSS design", IET Microwaves Antennas & Propagation, vol. 1, No. 2, pp. 314-321, May 2007.

\* cited by examiner

GNSS ANTENNA ADD-ON

CROSS-REFERENCE TO RELATED APPLICATIONS

This application is a National Stage of International patent application PCT/EP2018/081191, filed on Nov. 14, 2018, which claims priority to foreign European patent application No. EP 17306611.9, filed on Nov. 21, 2017, the disclosures of which are incorporated by reference in their entirety.

FIELD OF THE INVENTION

The present invention applies to the field of Global Navigation Satellite Systems (GNSS) receivers. More specifically, the invention describes an add-on for a GNSS receiver, which increases the robustness of GNSS receivers against multipath reflections.

BACKGROUND PRIOR ART

GNSS positioning techniques have been used and improved for many years now. Two Global Navigation Satellite Systems (GNSS) have been fully deployed for a number of years (the US Global Positioning System (GPS) and the Russian GLONASS™) and two more are under deployment (the Chinese Beidou Navigation Satellite System and the European Galileo™).

These systems provide a precise and accurate positioning measurement relying on the same principles: microwave radio frequency (RF) signals are broadcast on a common carrier frequency from a number of satellites in orbit around our planet; the signals carrying a navigation message spread using a PRN (Pseudo Random Noise) sequence specific to each transmitter. On the receiver side, the various transmissions are identified from their PRN code sequence. For at least four satellites in view, the time of arrival is used together with information about the transmission time and the position of the satellite, both retrieved from the navigation message, to compute a pseudo-range measurement, which relates to the distance between the receiver and the satellite. When four or more pseudo-range measurements are calculated from distinct satellites, the receiver calculates a position, velocity and time measurement (PVT), for instance by trilateration.

Among the various phenomena that impact the accuracy of the positioning system are the signal reflections. Indeed, in order to make a relation between the distance separating a satellite and the receiver (pseudo-range) and a propagation time, the satellite considered has to be in line of sight (LOS) with no signal reflection. On the receiver side, the direct propagation path may be received along with multipath reflections of the positioning signal, which result from reflections of the signal over various elements of the propagation environment. These paths are delayed versions of the direct path, which generally come attenuated and phase shifted.

The multipath reflections create artifacts that affect the pseudo-range measurements, and therefore the GNSS receivers' accuracy. Depending on the propagation environment and/or antenna performances, these multipath reflections can have a power level that is close to, and sometimes greater than, the power level of the direct path.

The multipath reflection can be divided into two categories:
Those which are delayed by more than one PRN code chip from the direct propagation path, and that therefore generate inter-symbol interference. This situation is known as "selective fading". Selective fading can, to a certain extent, be mitigated implementing signal processing techniques (equalizer) in the GNSS receiver software. However, such techniques are complex to implement, do not perfectly remove the interferences, and therefore require to be complemented by hardware solutions, to reduce the power level of the multipath reflections;
Those which are delayed by less than one PRN code chip from the direct propagation path. As the reflected path travels a greater distance than the direct path, they recombine at the level of the receiver antenna with different phases, either in a constructive or a destructive manner. When they recombine in a destructive manner, i.e. when they are in phase opposition, the received signal's amplitude decreases, and the signal may eventually disappear. This situation is known as "flat fading". Flat fading cannot be mitigated by software algorithms, and therefore has to be handled upstream the GNSS receiver by a hardware solution.

Selective fading is a common situation in urban environments. It comes from reflections of the positioning signal over the various elements of the propagation environment, like buildings, cars, trees, etc . . . Selective fading may be advantageous for most telecommunications standards, where the equalizer recombines in time and phase the direct and reflected paths, increasing thus the signal to noise ratio. However, it is not the case for positioning purposes, where the direct path is the only path to consider for calculating pseudo ranges measurements. The reflected paths are only sources of inaccuracies and should be suppressed. Flat fading relates to signal reflections due to the propagation environment elements located close to the receiver. It results in signal losses and/or a lower accuracy of the receiver.

GNSS signals transmitted by satellites are Right Hand Circularly Polarized (RHCP). To enhance the robustness of GNSS receivers, it is known to use antennas configured to receive RHCP signals and reject Left Hand Circularly Polarized (LHCP) signals. Indeed, when an electromagnetic signal is reflected, its polarization changes to the orthogonal polarization (in that case, the reflected signals are Left Hand Circularly Polarized, or LHCP). Using RHCP antennas in a GNSS receiver, the power level of LHCP signals, i.e. signals reflected an odd number of times, is greatly decreased, and the accuracy of the receiver is less degraded with regard to the case with no multipath reflections. Thus, using an RHCP antenna at the receiver side is sufficient to handle a large number of multipath propagation scenarios. However, the efficiency of this technique highly depends on the quality of the receiving antenna diagram, and some propagation environments, notably in dense urban environments, might still be an issue.

One of these issues is proper to mobile GNSS receivers, as for instance GNSS chips embedded in smartphones, or handheld GNSS receivers. Indeed, these receivers are designed to be manipulated, and there is no a priori about their orientation. It is therefore not possible to use directional antennas in such receivers, and they usually come equipped with omnidirectional antennas that radiate in a solid angle of $4\pi$ steradians. It is difficult to be selective in polarization for such antennas, which therefore attenuate more or less efficiently LHCP signals depending on their angle of arrival.

In addition, portable devices may be located in places where a direct visibility with satellites is not ensured. Part of the direct path propagates through some material, and is therefore attenuated. This is the case for instance for a smartphone transported in a bag, or a mobile GNSS receiver in a car, where the attenuation comes from the bag and its contents, potentially the user's body, the car's roof, . . . . Conversely, reflected paths may propagate in free space only, and, although being attenuated by the antenna gain, may reach the receiver with power levels equivalent or greater than the power level of the direct path. To overcome this issue, it is known to position the receiver in a favorable place, for instance on a support close to the windshield of a car, so that it has its free space field of view is maximized. FIG. 1 represents such a device, wherein a GNSS receiver 101 is positioned on a support 102 hooked over the windshield 103 of a car by way of a suction cup for instance. On the illustration of FIG. 1, when satellite 104 transmits a GNSS positioning signal, it reaches the receiver through a direct path 110, a path 111 reflected over the top of a dashboard 106, a path 112 reflected over the car hood 107, and a path 113 reflected over an element 105 of the propagation environment, as for instance a building. Such devices help maximizing the number of satellites in direct view of the receiver. Most of the direct paths therefore do not have to cross through materials, and show a higher power level than the reflected paths. However, they are not optimal, as the antenna diagrams of such receivers may not efficiently reject the LHCP reflected paths 111, 112 and 113, in particular paths 111 and 112 coming from below the antenna. In Khosravi, Moghadas and Mousavi, "A GNSS Antenna with a polarization selective surface for the mitigation of low-angle multipath interference", IEEE transactions on antennas and propagation, vol. 63, No. 12, December 2015, a polarization selective surface is disposed over a GNSS patch antenna. The aim of the surface is to multiply the electric field by a factor to facilitate multipath rejection by the antenna. However, the polarization selective surface has to be designed considering the antenna diagram, and modifies but does not reject LHCP reflected paths.

It is also known to connect the GNSS receiver to an external antenna having a gain in elevation toward the sky, as for instance a patch antenna hooked to the windshield or mounted on the roof of a car, or a patch antenna mounted over a pole in a backpack. It is also known to hook a GNSS receiver having a patch antenna to the windshield of a car, and connect this GNSS receiver to a display through a wired or wireless (Bluetooth™, Wi-Fi™, . . . ) connection. FIG. 2 represents a device where a GNSS receiver 201 is connected to an antenna 202 positioned at the top of a pole 203 hooked to a backpack 204. On the illustration of FIG. 2, when satellite 104 transmits a positioning signal, it reaches the receiver through a direct path 210, a path 211 reflected over an element of the propagation environment, as for instance a metallic helmet 205, a path 212 reflected over the metallic elements stored in the backpack, and a path 213 reflected over an element 105 of the propagation environment. Such devices help to maximize the number of satellites in direct view of the receiver, and the use of a patch antenna efficiently reduces the power level of LHCP signals (211, 212, 213). However, there are some directions in the antenna diagram where LHCP signals may not be efficiently rejected. That is the case for instance for reflected paths 211 and 212 which come from under the antenna, i.e. with a high off-boresight angle, or. In a car, such reflected paths may come from reflections over the dashboard or the car hood. It the case of FIG. 2, they may come from reflections over the backpack. These reflections are all the more disadvantageous as, due to the short distance between the reflector and the antenna, they generate flat fading which cannot be software-mitigated.

FIG. 3 illustrates a radiation pattern for an omni-directional patch antenna configured to receive GNSS signals in a solid angle of 2π steradians, as known from the prior art. In FIG. 3 are represented the gain of the antenna in elevation, with respect to the off-boresight angle (OBA), in right hand and left hand circular polarization. Off-boresight angle is expressed with respect to the antenna oriented into the zenith direction, an off-boresight angle of 0° corresponding thus to a vertical up direction of the antenna pattern. The antenna diagram is omnidirectional in azimuth, both in RHCP and LHCP.

Line 301 represents the gain for a co-polarized electromagnetic wave, namely the gain when the received signal is RHCP. It can be observed that the gain is maximal when the signal comes from above the receiver (the off-boresight angle is null). This perfectly suits satellite communications. The gain decreases along with the increase of the off-boresight angle, and is close to zero when the signal comes from the back of the antenna.

Conversely, line 302 represents the gain for a cross-polarized electromagnetic wave, namely the gain when the received signal is LHCP. This gain is rather low when the off-boresight angle is null, and does not reach high values, except when the signals comes from under the antenna.

In FIG. 3, when the satellite is situated above the receiver (position 303), the gain difference between the right hand and left hand circularly polarized signals is of about 40 dB, which brings a natural protection against reflected propagation paths. This difference decreases conversely to the off-boresight angle. When the off-boresight angle is of about ±90° (meaning that the signal comes almost horizontally, position 304 on the figure), the difference is of about 10 dB, which is not sufficient to significantly attenuate the reflected propagation paths. When the off-boresight angle is of about ±140° (position 305 on the figure), this difference is null, and even negative when the signal comes from a higher angle. There is therefore an issue when the signals come with a high off-boresight angle (i.e. reflected signals coming from the rear of the antenna).

Rejection of GNSS reflected signals based on the use of polarized antenna only may therefore not be sufficient to ensure the effective functioning of GNSS receivers, and there is a need for a complementary solution to reject these multipath reflections upstream the GNSS receiver, notably when they come from the rear of the antenna.

SUMMARY OF THE INVENTION

It is an object of the invention to provide improvements over the prior art with a device, positioned close to the GNSS antenna, that helps mitigating multipath reflections without any consideration about the GNSS antenna diagram. The device therefore shows a full interoperability with any GNSS receiver.

To this effect, the invention discloses an add-on device configured to reduce the power level of reflected paths of GNSS signals reaching a GNSS receiver's antenna. The GNSS signals are transmitted according to a first polarization. The add-on device comprises a material configured to be transparent to said first polarization and to reflect GNSS signals polarized according to a second polarization orthogonal to said first polarization.

The first polarization may be a right hand circular polarization and the second polarization a left hand circular polarization.

Advantageously, the material comprised in the add-on device is configured to operate in at least one of the following frequency bands:

1164 MHz-1214 MHz,
1215 MHz-1254 MHz,
1260 MHz-300 MHz,
1559 MHz-610 MHz,
2483.5 MHz-2500 MHz, and
5010 MHz-5030 MHz, which are GNSS frequency bands currently used for GNSS communications. Of course, the frequency bands in which the invention is prone to operate are not limited to these bands, and can include any additional frequency band which may be used by GNSS communications in the future.

The invention further discloses a GNSS receiver set comprising:
  a GNSS receiver comprising an antenna configured to receive GNSS signals, and
  at least one add-on device according to any embodiment of the invention.

According to another embodiment of a GNSS receiver set according to the invention, the material is a polarization selective surface. Advantageously, the material is positioned in front of the GNSS receiver's antenna so as to reflect at least some of said reflected path of GNSS signals before they reach said GNSS receiver's antenna. In front of the GNSS receiver's antenna shall be understood as that the add-on device is disposed somewhere on the path of the reflected signals, between the position where they are reflected and the position of the GNSS receiver's antenna. As the route of the reflected paths can hardly be known in advance, the add-one device according to this embodiment is preferably positioned close to the antenna (close with regard to the distance between the transmitter and the receiver, for instance a few meters or less from the GNSS receiver's antenna), over surfaces through which the GNSS signals of highest power level are prone to arise. For instance, for a car or a house, these surfaces are the windows/windshield. For a smartphone, one of these surfaces is the smartphone case. Advantageously, the material may enclose the antenna.

Advantageously, the material may be optically transparent and/or may be a metalized textile.

The invention further comprises:
  a GNSS receiver case comprising an add-on device according to any embodiment of the invention; and
  a windshield, for a vehicle as for instance a car, a truck, a boat, or an aircraft, comprising an add-on device according to any embodiment of the invention, wherein the material of the add-on device is optically transparent.

The invention further comprises a method to reduce the power level of reflected paths of GNSS signals reaching a GNSS receiver's antenna. The GNSS signals are transmitted according to a first polarization. The method comprises the positioning of at least one add-on device configured to reduce the power level of reflected paths of GNSS signals, the add-on device comprising a material configured to be transparent to said first polarization and to reflect GNSS signals polarized according to a second polarization orthogonal to said first polarization. Advantageously, the material may be disposed in front of the GNSS receiver's antenna so as to reflect at least some of said reflected path of GNSS signals before they reach said GNSS receiver's antenna.

BRIEF DESCRIPTION OF THE DRAWINGS

The invention will be better understood and its various features and advantages will emerge from the following description of a number of exemplary embodiments provided for illustration purposes only and its appended figures in which.

The examples disclosed in this specification are only illustrative of some embodiments of the invention and may be combined when appropriate.

DETAILED DESCRIPTION OF THE INVENTION

Figure 1:
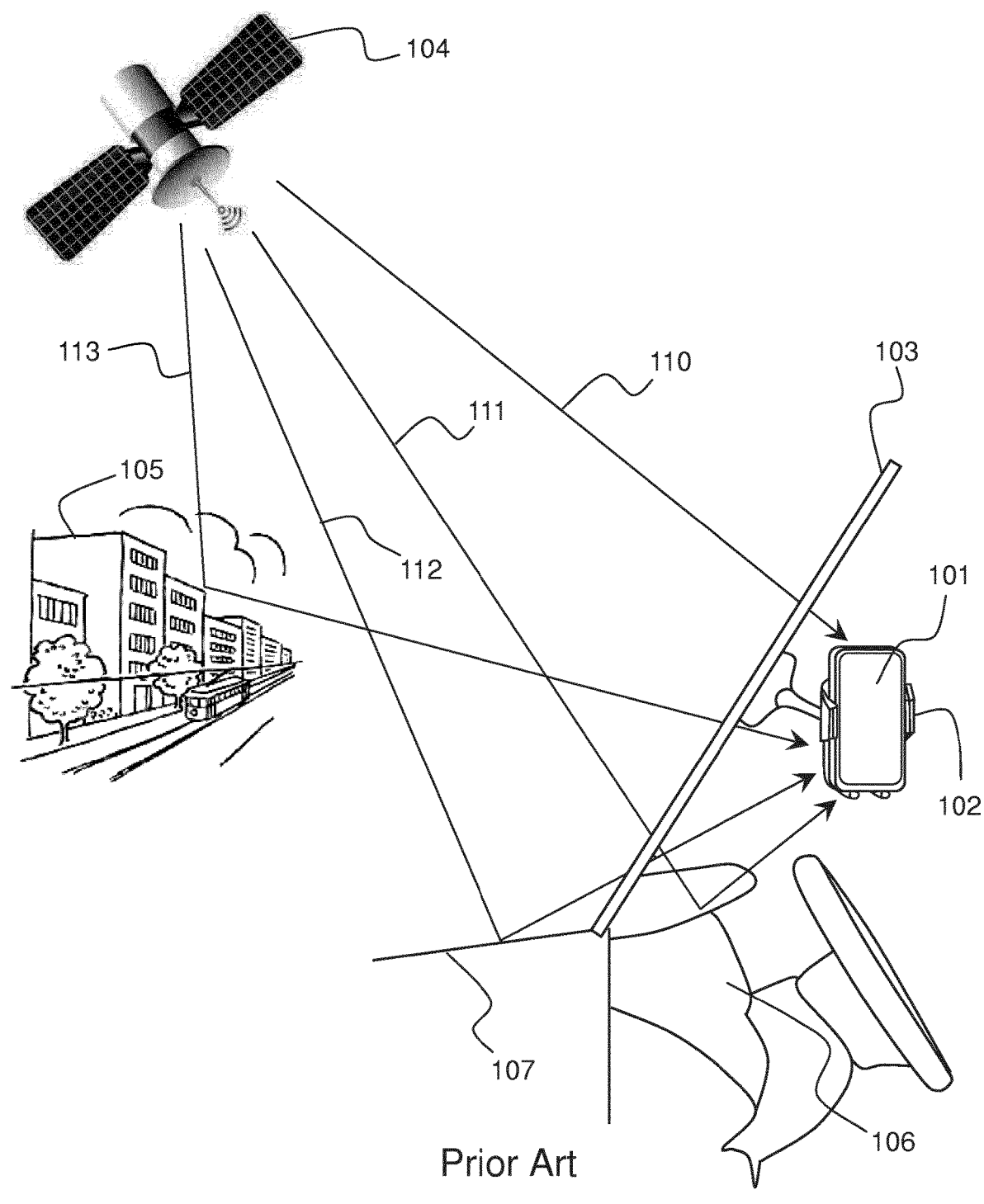
FIG. 1, already described, illustrates a use case where a GNSS receiver is embedded in a car, as known from the prior art.
Figure 4:
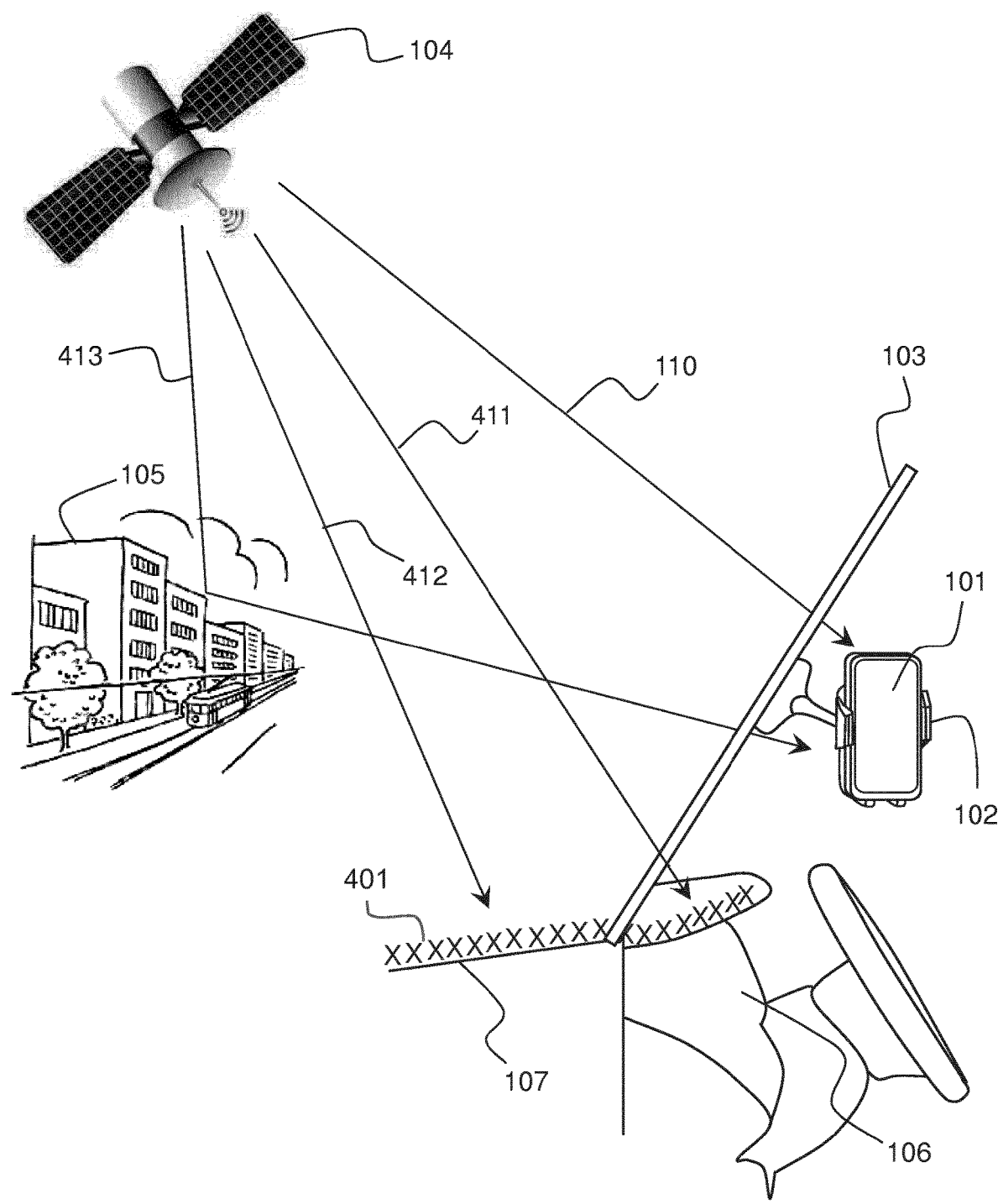
FIGS. 4 and 5 illustrate two exemplary embodiments of a device according to the invention, wherein a material configured to absorb RHCP GNSS signals is used.

FIG. 4 illustrates an embodiment of a device according to the invention. This illustration is made with respect to FIG. 1, considering a GNSS receiver 101 attached by a support 102 to the windshield 103 of a car, but would apply equally to many other scenario, in particular to the use case of a GNSS receiver connected to an external antenna attached to the windshield of a car, or to any use case wherein a GNSS receiver is prone to receive multipath reflections of propagation signals due to reflections occurring in the close environment of the receiver. In FIG. 4, the dashboard represented is a car dashboard, but the invention applies exactly the same way for any means of transportation or vehicle, like for instance the dashboard of a truck, a boat, an aircraft, but also to the fuel tank of a motorcycle or the frame of an electrical bike. It also applies the same way if the receiver is not attached to the windshield but to any other part of the vehicle, or placed over or into the top of the dashboard.

In the exemplary embodiment of FIG. 4, the dashboard of the car is coated with a material 401 configured to absorb RHCP GNSS signals, i.e. GNSS signals before they are reflected.

Such absorbing materials are already known from transceiver antennas. They are used to minimize parasitic reflections of the signal over the ground plan or the pole of the antenna, so they do not distort their radiation diagrams. They are also used to protect specific areas from radiations, as for instance to protect hospitals from electromagnetic interferences. Finally, they are used in anechoic chambers in order to characterize the electromagnetic radiations of electronic equipment. But they are never used in operational environments, as, by definition, all the sources of reflections, that is to say the whole propagation environment, would have to be covered by the absorbing material, which may not be technically feasible.

These absorbing materials, which generally come in the form of substantially periodic structures made of printed patterns or active carbon foam, are designed to operate in a definite frequency band. More elaborate materials are known, for instance from WO 2015/136121 A1, filed by the same applicant. They show higher absorption properties compared to classical absorbing materials, as they are specifically designed considering at least one from the frequency, polarization and angle of arrival of the signals.

The invention assumes that the most harmful reflected paths occur at the rear of the antenna within a known and limited area (car body and interior) mostly situated below the antenna, and that this area can be easily covered by an absorbing material, to reduce the power level of these reflected paths. Indeed, by covering the dashboard of the car with an absorbing material configured to absorb RHCP GNSS signals, most of path 411 is absorbed instead of being reflected. While most of the signal is absorbed, the power level of the reflected signal that still reaches the receiver is significantly decreased, and this reflected signal is therefore not a source of flat fading anymore. The absorbing material may be tuned to specifically absorb signals in the GNSS frequency bands, and, when the receiver's antenna shows some gain in elevation toward the sky, may be made made very efficient using the teachings of WO 2015/136121 A1, as the polarization (RHCP) of the signals that are intended to be absorbed is known. Indeed in that case, absorbing LHCP GNSS signals, as for instance signals reflected once before they meet the absorbing material, is not necessary as reflected left hand circularly polarized signals reaching the rear of the antenna are attenuated by the antenna gain. In addition, the range of angle of arrival of the GNSS signals is very likely to be given by the size and position of the windows and windshield apertures.

The device according to the invention, made of an absorbing material configured to absorb GNSS signals, may therefore be advantageously configured to specifically absorb right hand polarized signals. It may be placed over a car dashboard, as a supplementary layer, to cover it entirely or to cover a limited area located beneath the GNSS receiver. Alternately, the dashboard itself can be produced including an upper layer made of said absorbing material.

In an alternate embodiment, which can be combined with the previous one, the invention may aim at attenuating path 412, reflected over the body of the car. To this end, the car hood is covered with an absorbing material 402. Concerning path 413, it will not be absorbed by the material, and will reach the receiver, which will have to relate on its antenna gain to mitigate it.

The device according to the invention may be selected for its good absorption properties in one or more GNSS bands, which are, at the moment, mainly the following bands:
1164 MHz-1214 MHz,
1215 MHz-1254 MHz,
1260 MHz-1300 MHz,
1559 MHz-1610 MHz,
2483.5 MHz-2500 MHz, and
5010 MHz-5030 MHz.

Figure 2:
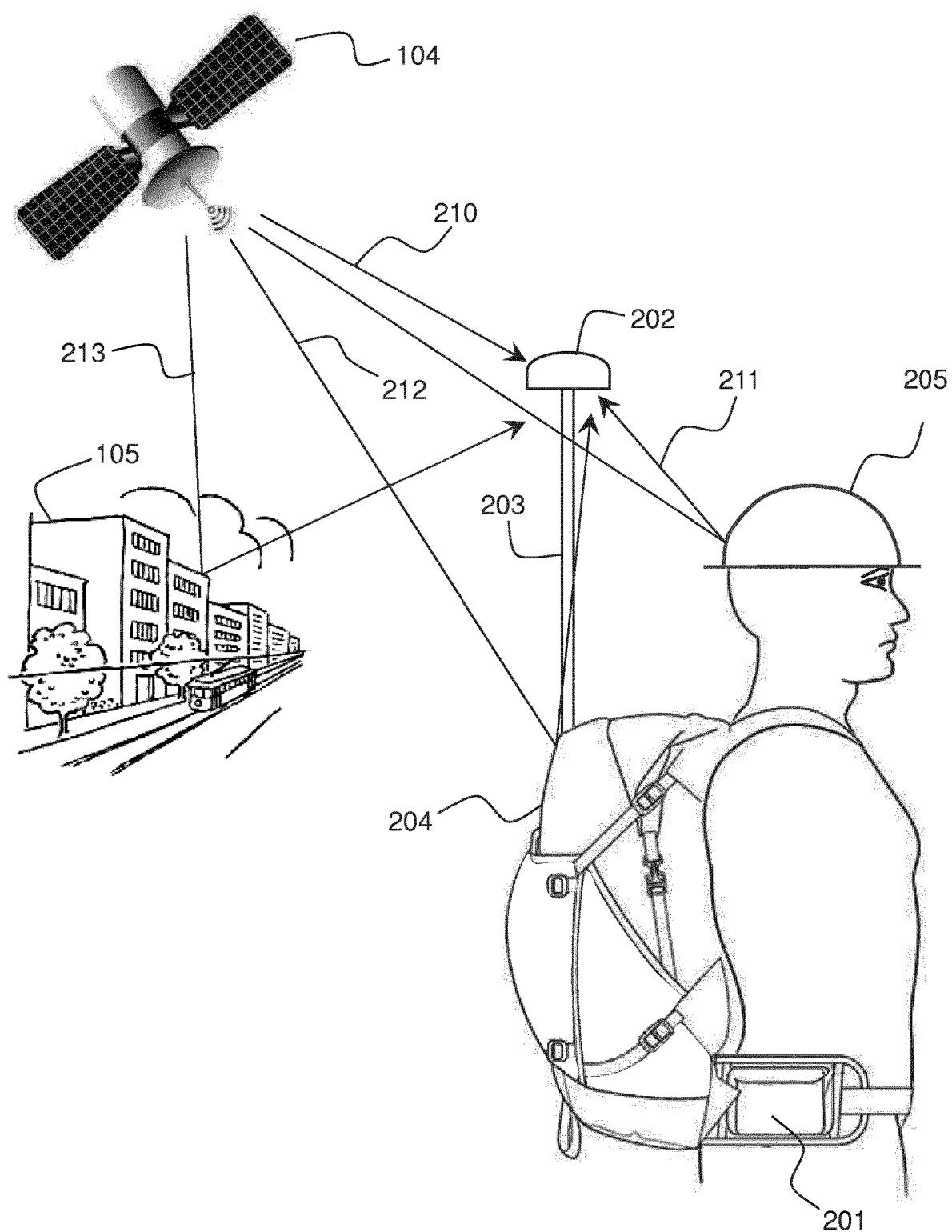
FIG. 2, already described, illustrates a use case where a GNSS receiver is connected to a remote antenna positioned at the top of a pole, as known from the prior art.
Figure 3:
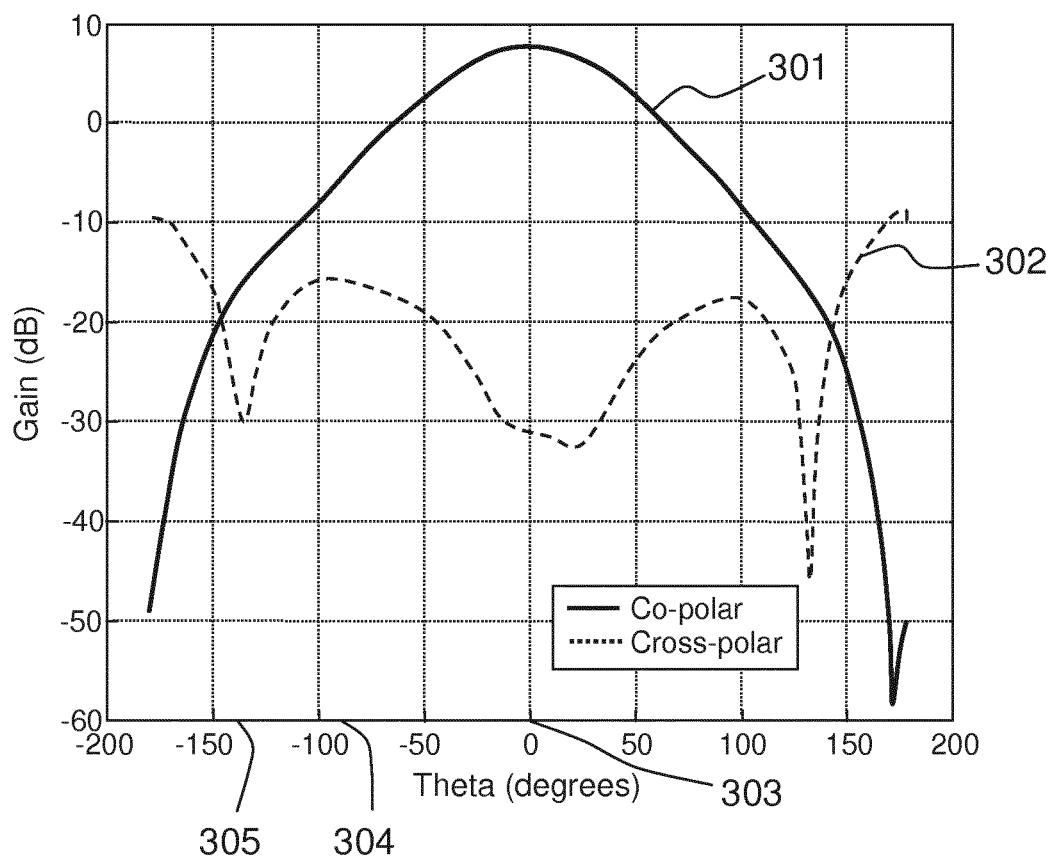
FIG. 3, already described, illustrates a radiation pattern for an omni-directional patch antenna configured to receive GNSS signals as known from the prior art.
Figure 5:
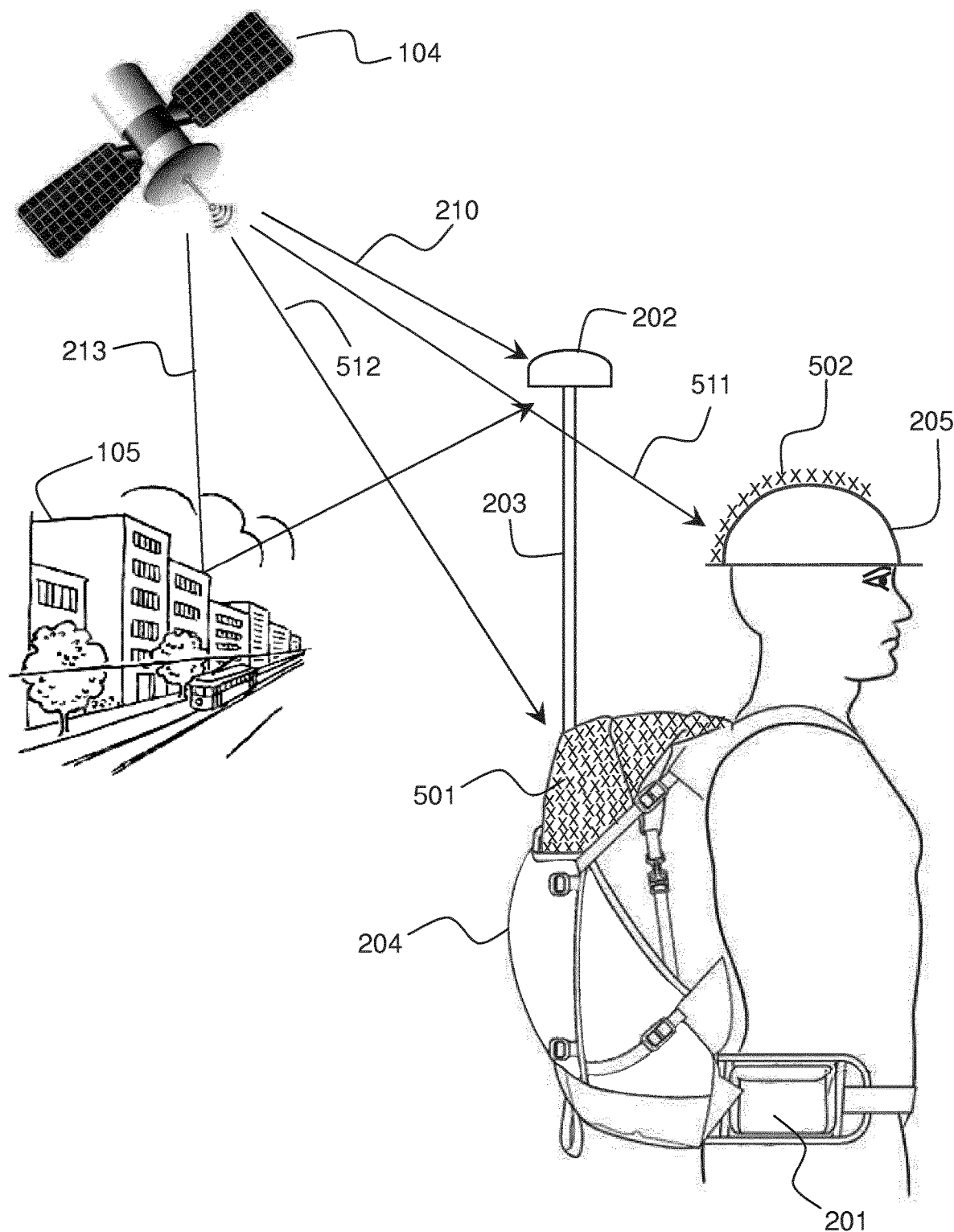

The invention can easily be adapted to various use cases, including the one represented in FIG. 2, wherein a patch antenna 202 is mounted over a pole 203 in a backpack 204. FIG. 5 illustrates one example of such a use case. As the most harmful reflections come from below the antenna, that is to say from the content of the backpack 204 and/or the user's helmet 205, these areas can be easily covered with an absorbing material (501, 502), to absorb signals before they reflect, reducing thus the flat fading phenomenon and increasing the accuracy of the receiver. The material shall be positioned around the GNSS receiver, in a way that it does not to interfere with the direct propagation path, that is to say without hiding the direct view of the satellites by the GNSS receiver. Similarly, the invention may be implemented for other use cases, as for instance over a motorbike or a bicycle, or over any helmet used as a motorcycle helmet, a heavy-duty helmet, etc . . .

By positioning the absorbing material below the antenna, on top of the sources of reflections, the direct propagation path 210 and the path 213 reflected over elements of the propagation environment 105 located far from the GNSS receiver, are not attenuated. On contrary, propagation paths 511 and/or 512, lose power level when reflecting over the layers of absorbing materials, reducing thus the occurrence of flat fading.

In this use case, the invention may be implemented by way of a layer of absorbing material dropped on top or disposed within the backpack (the important thing being that the absorbing material is above the metallic elements of the backpack that generate the signal reflections), or by designing a backpack which top incorporates said absorbing material. The absorbing material is configured to show good absorption performances into the GNSS bands, and may advantageously be configured to specifically absorb RHCP signals.

By covering limited areas that are prone to reflect paths that reach the rear of the antenna with an add-on device which is independent from the GNSS receiver and which is configured to absorb RHCP GNSS signals upstream the antenna, the invention processes GNSS signal reflections even before they occur. Implementing the invention is made possible as it does not attempt to mitigate each source of multipath reflection, but focuses on specific multipath reflections that are particularly harmful as not handled correctly by polarized antennas. These multipath reflections are a source of flat fading, and cannot be software-mitigated. In addition, the invention does not rely on any specific GNSS receiver architecture or antenna properties, and is fully compliant with any kind of receiver, without any antenna diagram consideration.

Alternately, or in addition to the power level reduction of reflected path by use of an absorbing material, the invention proposes to reduce the sources of selective fading by filtering the reflected LHCP signals prior to their reception by the receiver's antenna. To this end, the invention proposes to use reflective materials, such as Polarized Reflective Surfaces (PRS) or Polarized Selective Surfaces (PSS), which are two appellations for electromagnetic devices having the same properties, in order to reflect most of the LHCP GNSS signals (i.e. the signals reflected by the propagation environment) upstream the antenna, while being transparent to the RHCP GNSS signals. What is meant by transparent to RHCP GNSS signals is that most of the signal can pass through it. This surface shall be positioned in front of the GNSS receiver's antenna, so as to be on the propagation path of the various reflected paths, preferably close to the antenna (or to the antennas for multi-antenna receivers) so as to maximize the number of multipath reflections crossing through the reflective material.

Such PRS/PSS electromagnetic structures have been known for many years for other purposes. They are substantially periodical structures made by way of periodic conductive lines disposed according to the frequency band and polarization of interest, which aim at being transparent to one specific signal polarization and at reflecting the orthogonal polarization.

For instance, PSS surfaces designed to reflect circularly polarized signals are known, for instance, from satellite antenna reflectors, as described in Cappellin and al., "Design and Analysis of a Reflector Antenna System Based on Doubly Curved Circular Polarization Selective Surfaces", Proc. EuCAP'2016, 10th European Conference on Antennas and Propagation (EuCAP), April 2016. Such surfaces may be made of a plurality of metal meander line sheets separated by $\lambda_0/8$ and rotated of 45° with respect to the neighboring sheets, where $\lambda_0$ is the center wavelength of operation. Many other patterns are known to implement circularly polarized selective surfaces, using for instance coupled split-ring resonators, or resonant helices. Such PSS surfaces may be designed as reciprocal surfaces, in order to reflect one particular circular polarization.

Depending on the embodiment, they may also have to be optically transparent to some part of the visible spectrum and/or infrared. Optically transparent PRS/PSS surfaces operating in the visible spectrum are used on sunglasses, to reduce the luminosity by considering the polarization of the optical signal. Other PRS/PSS surfaces are used on receiver antennas configured to receive a signal in a frequency band shared by two orthogonally polarized signals.

Various techniques are known to design optically transparent PRS/PSS filters. One of them is to use a transparent dielectric substrate of glass or Plexiglass™ type, and to form the lines using an optically transparent conductive material (as for instance oxide indium doped with tin ITO or tin oxide doped with silver AgHT) on a plastic film, for example on a polyester film.

Another technique is to use a transparent dielectric substrate of glass or Plexiglass type, and to implement the lines in the form a metal mesh (e.g. of silver or copper), typically in a grid. The level of transparency is then defined by the size of openings in the grid with regard to the conductors' width.

Figure 6:
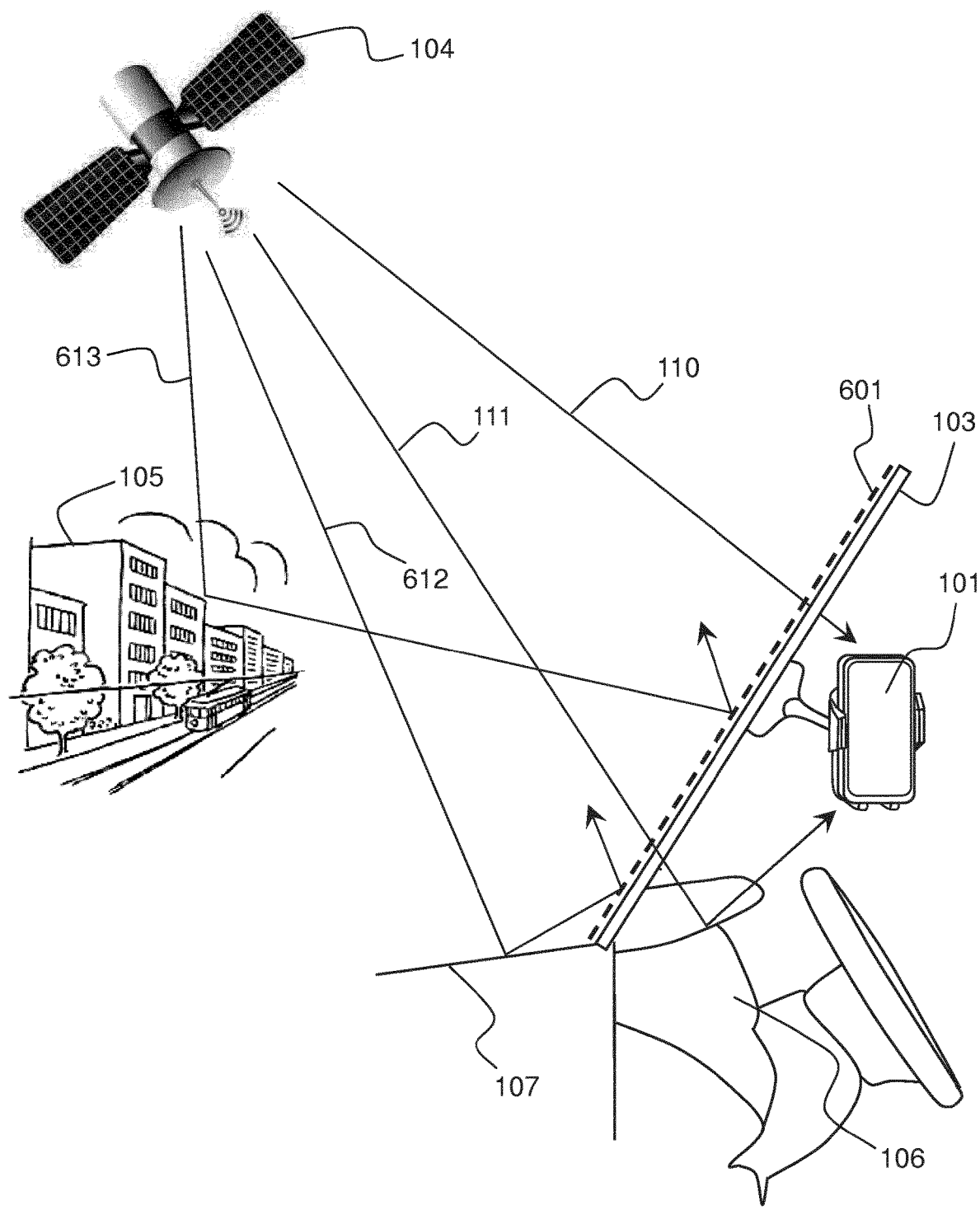
FIGS. 6, 7 and 8 illustrate various exemplary embodiments of a device according to the invention, wherein a material configured to reject LHCP GNSS signals is used.

By reflecting/filtering LHCP GNSS signals before they reach the receiver's antenna, the invention provides an additional reduction of the power level of signals reflected by the propagation environment. FIG. 6 illustrates an embodiment of a device according to the invention. Once again, this illustration is made with respect to FIG. 1. In this embodiment, a PRS/PSS filter 601 is put over or under the windshield 103 of a vehicle, like for instance a car, a truck, an aircraft, or any other vehicle. Alternately, this PRS/PSS filter may be inserted into the windshield during its production, similarly to what is done for car defrosting systems.

Windshields having specific properties, like for instance athermic windshield designed to limit the passage of sunrays, are known. They may also reflect GNSS signals, unintendedly and without any consideration related to their polarization. The filter, or windshield, according to the invention takes into consideration the polarization of the signals, and reflects most of the LHCP GNSS signals while it let pass as much as possible of the RHCP GNSS signals.

Therefore, direct path 110, as well as path 111, which are reflected within the car, cross through the PRS/PSS surface unaltered, and both signals reach the receiver with a high power level. Paths 612 and 613, which are reflected from outside of the vehicle, are reflected again by the LHCP filter, and most of these signals do not reach the receiver's antenna. Thus, the power level of reflected paths reaching the GNSS receiver is significantly decreased when these paths are reflected in the propagation environment far from the receiver (613), which are prone to generate selective fading. They are also significantly decreased when they are reflected close to the receiver but upstream the LHCP PRS/PSS filter (612), which are prone to generate flat fading.

Reflected path 612 may be easily overcome by combining this embodiment with the previous embodiment, wherein the car hood is covered by a material absorbing GNSS signals, and advantageously absorbing RHCP GNSS signals. In that case, the GNSS reflections occurring before the PRS/PSS surface come attenuated by this reflective surface, and the GNSS reflections occurring after the PRS/PSS surface come attenuated by the absorbing material. The GNSS receiver therefore receives a non attenuated GNSS signal direct path, and attenuated GNSS signal reflected paths, which improves its receiving capabilities.

Figure 7:
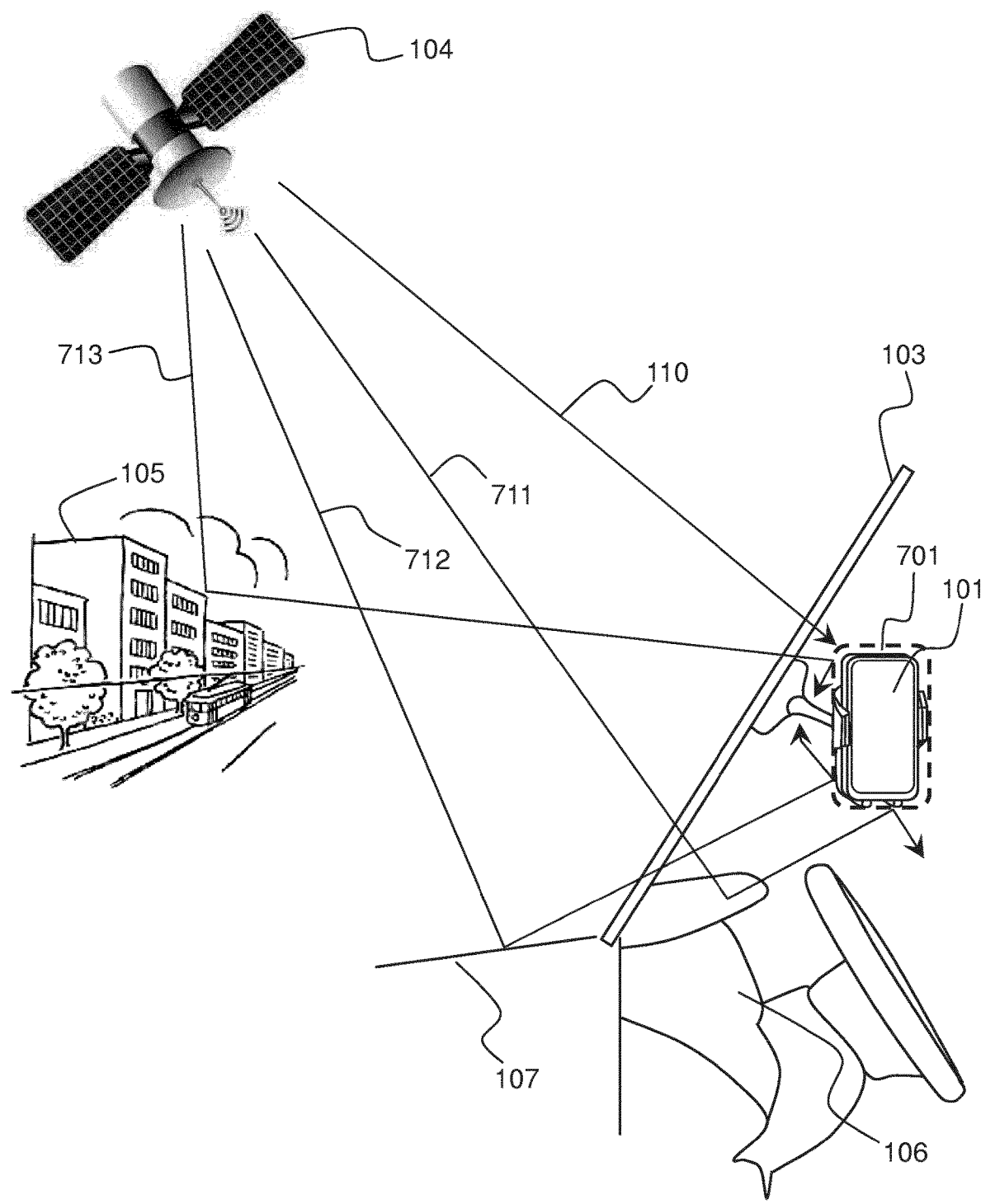

According to another embodiment illustrated in FIG. 7, which suits the case of a GNSS receiver set up over a support, the material made of PRS/PSS is not put over the windshield of the vehicle, but is arranged into the form of a case 701 that encompasses the whole GNSS receiver 101, or the external antenna. The case does not necessarily cover the whole GNSS receiver, but may be limited to the sides of the receiver directed towards the satellites. The PRS/PSS material does not necessarily have to be optically transparent, unless the receiver comprises display means. In that case, the optically transparent parts can be limited to the parts of the case facing the display.

This embodiment can be advantageously adapted to any type of handheld GNSS receiver, to an external GNSS antenna, or to a portable device such as a smartphone or the like, comprising a GNSS chip.

Direct path 110, which is RHCP, is unaffected by the receiver case 701, while the reflected paths 711, 712 and 713 are reflected by the PRS/PSS material, and do not reach the antenna of the GNSS receiver. Therefore, it is preserved from both flat and selective fading.

Figure 8:
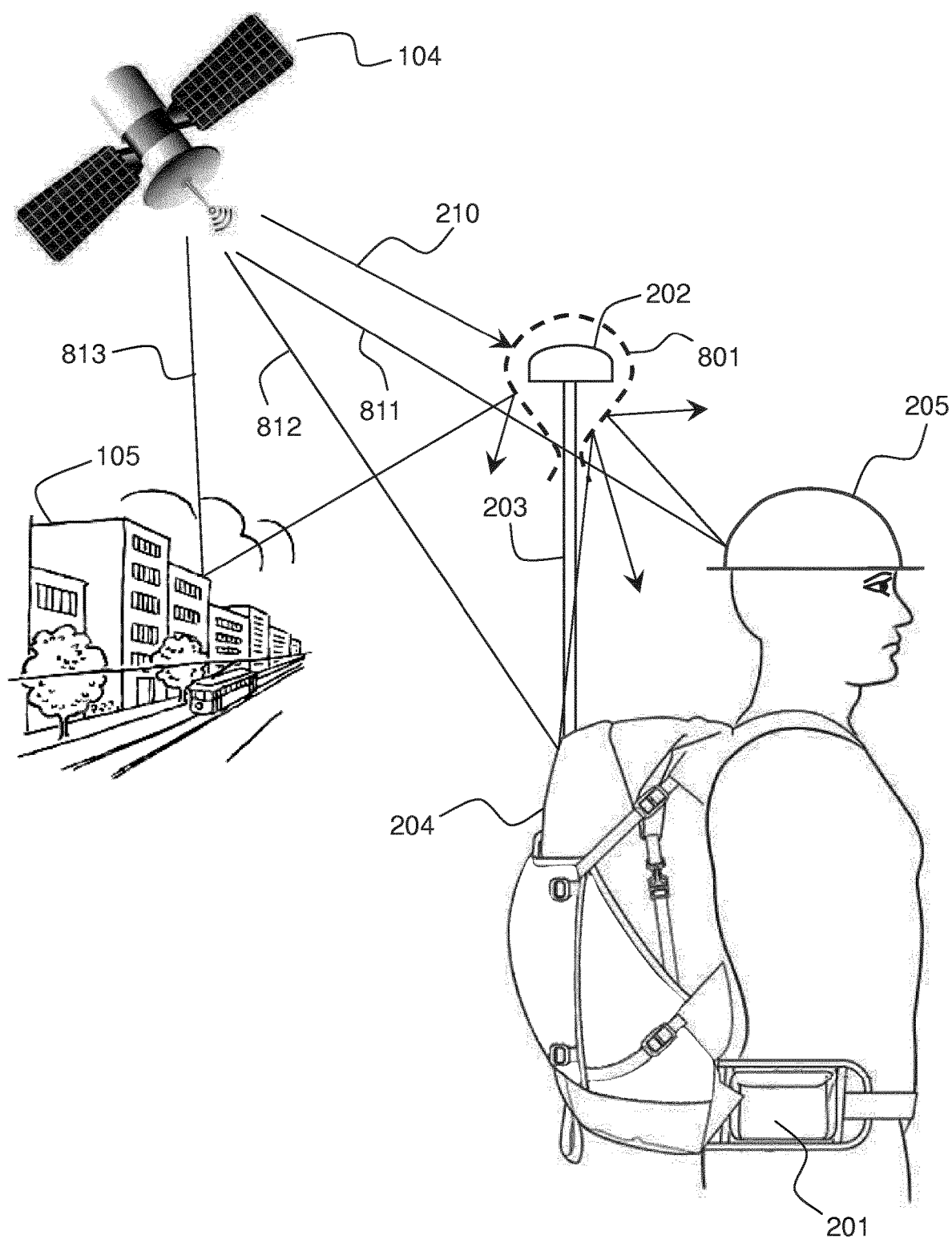

FIG. 8 illustrates another implementation embodiment, regarding the use case of FIG. 2 where a patch antenna 202 is mounted on top of a pole 203.

In this embodiment, the antenna 202 is covered by a PRS/PSS material 801 configured to reject LHCP GNSS signals. The PRS/PSS cover can be in the form of a hard case, as illustrated in the example shown in FIG. 7, or in the form of a covering layer 801 made of a metalized textile positioned over the antenna or incorporated in an existing cover, as for instance a boat cover or a car soft top. Indeed, it is known to give to some textiles electromagnetic properties, in particular polarizing properties, by printing PRS or PSS patterns directly over the textile. The textile acts as a dielectric substrate, while the patterns may be printed (using for instance a conductive ink) or sewn (using conductor wires) within and/or over the textile. It can also be included in a radome protecting the antenna from rain and dust.

The reflected paths 811, 812 and 813 are advantageously rejected by the PRS/PSS metalized textile 801, while the direct propagation path 210 is not affected by the polarization.

Figure 9:
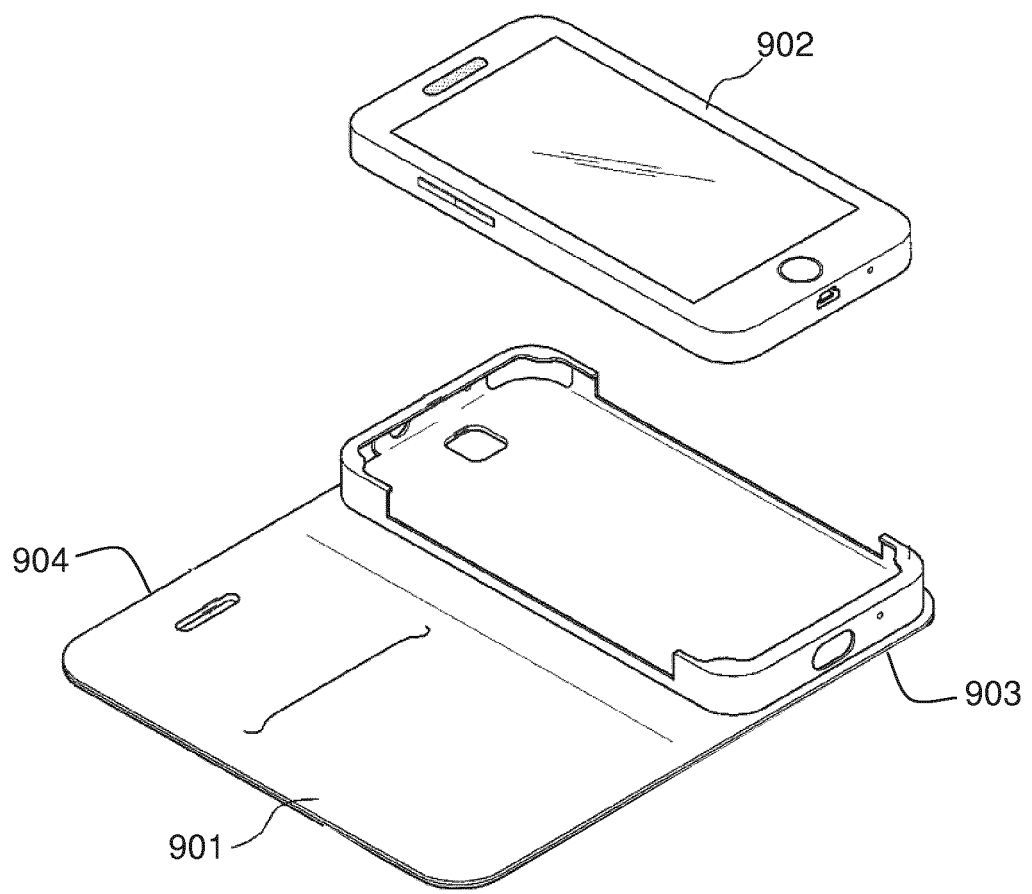
FIG. 9 represents another embodiment of the invention, in the form of a smartphone case.

FIG. 9 represents another embodiment of the invention, in the form of a smartphone case. In FIG. 9, a flip case 901 is designed to protect a smartphone against shocks. The flip case comprises a PRS/PSS material configured to reject LHCP GNSS signals. The filter may be inserted into the rear part 903 of the flip case, into the front part 904, or into the whole case. It can advantageously be used in a vehicle in combination with the windshield configuration described previously. It is particularly useful as it helps mitigating the power level of reflected GNSS signals reaching smartphones which usually don't come equipped with polarized antennas The smartphone case according to the invention is not limited to flip case but may be any type of case covering all or part of the smartphone or it could be part of the housing of the smartphone itself.

The invention also comprises a method to reduce the power level of reflected GNSS signal paths in a GNSS receiver. The method comprises the positioning of one or more materials configured to absorb GNSS signals polarized according to the polarization of the GNSS signals transmitted, or to reflect GNSS signals polarized according to a polarization orthogonal to the polarization of the GNSS signals transmitted.

Such materials may be one or more from absorbing materials, positioned under the antenna of a GNSS device, as for instance over the dashboard of a car, and electromagnetic materials designed to reflect GNSS signals according to a given polarization between the GNSS satellites and the GNSS receiver.

While embodiments of the invention have been illustrated by the description of various examples, and while these embodiments have been described in considerable details, it is not the intent of the applicant to restrict or in any way limit the scope of the appended claims to such details. In particular, combination between the various embodiments described may be performed, as for instance using both a material configured to absorb right hand circularly polarized signals, and a material configured to reject left hand circularly polarized signals.

The invention in its broader aspects is therefore not limited to the specific details, representative methods, and illustrative examples shown and described. The invention does not applies to right hand circularly polarized GNSS signals only, but applies the same way for left hand circularly polarized GNSS signals, and more broadly, to any type of signals transmitted according to a first polarization, as long as a reflection of said signal results in an orthogonal polarization change.

The invention claimed is:

1. An add-on device configured to reduce a power level of reflected paths of GNSS signals reaching an antenna of a GNSS receiver, the GNSS signals being transmitted according to a first polarization, the add-on device comprising a material disposed external of the antenna of the GNSS receiver, wherein the material is configured to be transparent to the first polarization and to reflect GNSS signals polarized according to a second polarization orthogonal to the first polarization prior to the antenna of the GNSS receiver.

2. The add-on device of claim 1, wherein the first polarization is a right hand circular polarization and the second polarization is a left hand circular polarization.

3. The add-on device of claim 1, wherein said material is configured to operate in at least one of the following frequency bands:
   1164 MHz-1214 MHz,
   1215 MHz-1254 MHz,
   1260 MHz-1300 MHz,
   1559 MHz-1610 MHz,
   2483.5 MHz-2500 MHz, and
   5010 MHz-5030 MHz.

4. A GNSS receiver set comprising:
   a GNSS receiver comprising an antenna configured to receive GNSS signals, and
   at least one add-on device according to claim 1.

5. The GNSS receiver set of claim 4, wherein the said material is a polarization selective surface.

6. The GNSS receiver set of claim 5, wherein the said material is positioned in front of the GNSS receiver's antenna so as to reflect at least some of said reflected path of GNSS signals before they reach said GNSS receiver's antenna.

7. The GNSS receiver set of claim 5, wherein the said material is optically transparent.

8. The GNSS receiver set of claim 5, wherein the said material is a metalized textile.

9. A GNSS receiver case comprising an add-on device according to claim 1.

10. A windshield comprising an add-on device according to claim 1, wherein the said material is optically transparent.

11. A method to reduce a power level of reflected paths of GNSS signals reaching an antenna of a GNSS receiver, the GNSS signals being transmitted according to a first polarization, the method comprising positioning at least one add-on device having a material disposed external of the antenna of the GNSS receiver, wherein the material is configured to be transparent to the first polarization, wherein the at least one add-on device is configured to reduce the power level of the reflected paths, wherein the material is configured to reflect GNSS signals polarized according to a second polarization orthogonal to said first polarization prior to the antenna of the GNSS receiver.

* * * * *